(No Model.)  2 Sheets—Sheet 1.
C. M. MERRILL.
COMPUTING SCALE.
No. 573,892. Patented Dec. 29, 1896.
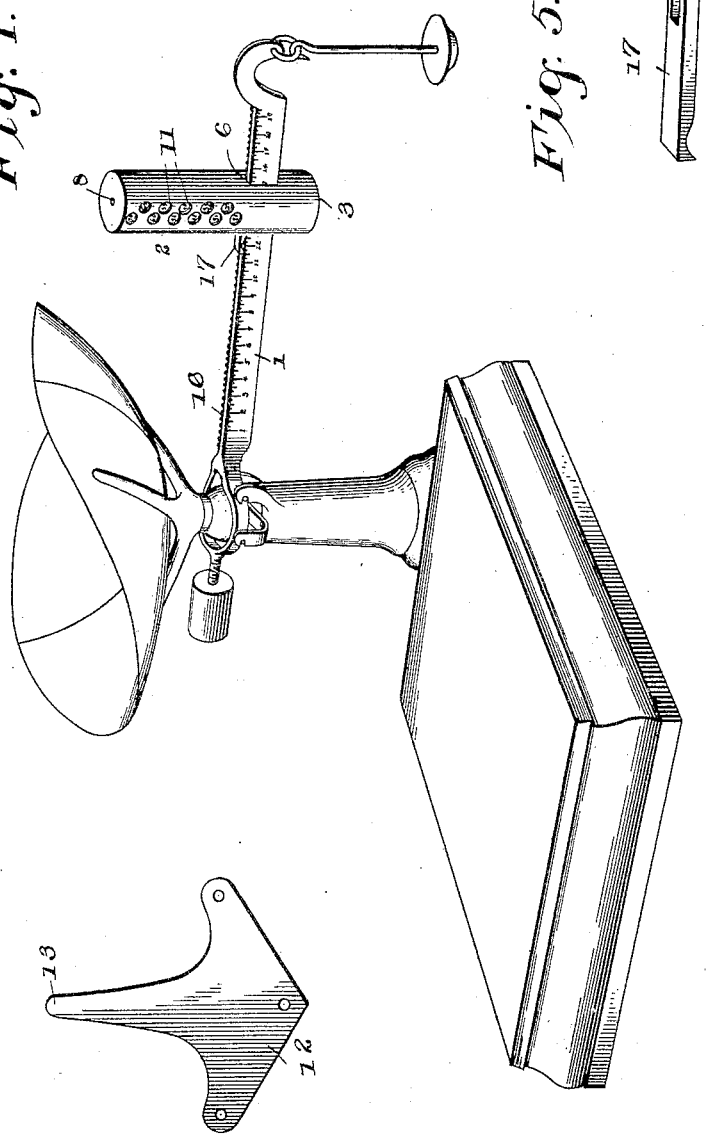
Witnesses
Chas. A. Ford.
Inventor
Cassius M. Merrill,
By his Attorneys.
C. A. Snow & Co.

(No Model.) 2 Sheets—Sheet 2.

C. M. MERRILL.
COMPUTING SCALE.

No. 573,892. Patented Dec. 29, 1896.

Witnesses
Chas. A. Ford.
C. E. Doyle

Inventor
Cassius M. Merrill.
By his Attorneys.
C. A. Snow & Co.

UNITED STATES PATENT OFFICE.

CASSIUS M. MERRILL, OF LOUISVILLE, KENTUCKY.

COMPUTING-SCALE.

SPECIFICATION forming part of Letters Patent No. 573,892, dated December 29, 1896.

Application filed November 14, 1895. Serial No. 568,953. (No model.)

*To all whom it may concern:*

Be it known that I, CASSIUS M. MERRILL, a citizen of the United States, residing at Louisville, in the county of Jefferson and State of Kentucky, have invented a new and useful Computing-Scale, of which the following is a specification.

My invention relates to computing-scales, and particularly to a pea or poise adapted for use in connection with a scale-beam; and the object in view is to provide a simple and improved device adapted to indicate the amount of an article or substance at a stated price per pound which should be sold for a given sum, and, furthermore, to provide means for adjusting the device to adapt it for weighing upon either the platform or the scoop of a scale.

Further objects and advantages of this invention will appear in the following description, and the novel features thereof will be particularly pointed out in the appended claims.

Figure 3:
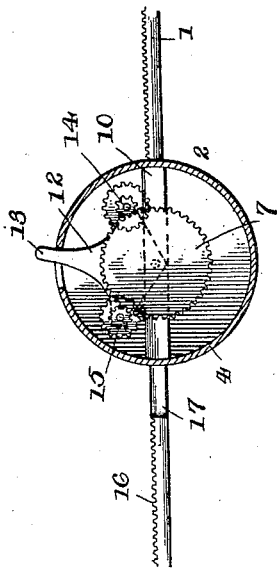
Figure 6:
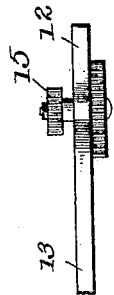
Figure 2:
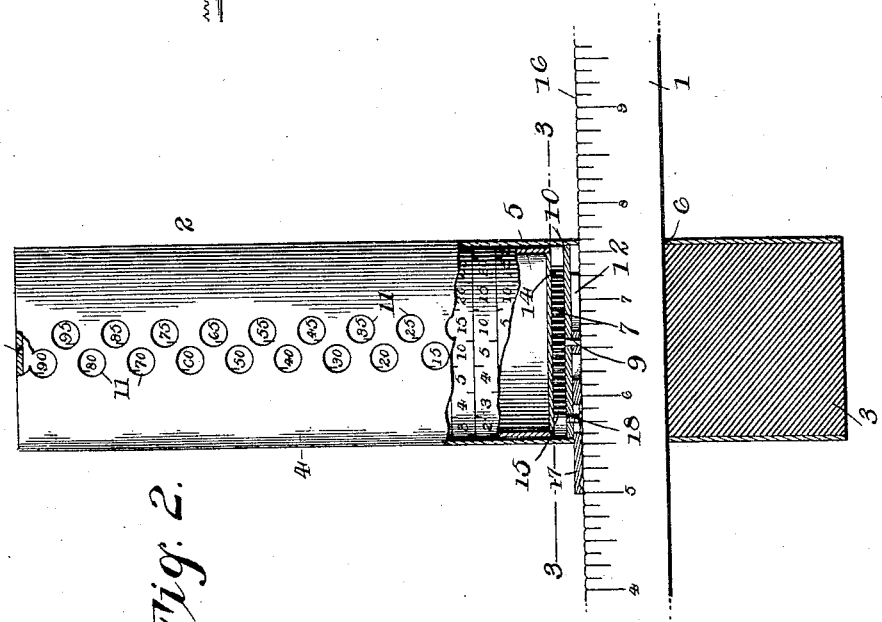

In the drawings, Figure 1 is a perspective view of a pea or poise constructed in accordance with my invention applied to a scale. Fig. 2 is a partial vertical section of the pea or poise. Fig. 3 is a horizontal section on the line 3 3 of Fig. 2. Fig. 4 is a detail view of the switch. Fig. 5 is a detail view of the pointer. Fig. 6 is a detail side view of the switch.

Similar numerals of reference indicate corresponding parts in all the figures of the drawings.

1 designates a scale-beam provided with suitable graduations, and 2 a pea or poise embodying my invention, said pea or poise comprising, essentially, a weight 3, which is arranged below the scale-beam, and concentric outer and inner cylinders 4 and 5, arranged above the scale-beam, the outer cylinder being extended below the scale-beam and attached to the weight. The transverse opening 6 for the scale-beam is formed in the outer cylinder contiguous to the plane of the upper side of the weight, and the inner cylinder, which is adapted to rotate freely in the outer cylinder, extends downward to a point contiguous to the plane of the upper edge of the scale-beam and is provided with a gear 7. The inner cylinder is provided at its upper and lower ends with bearing points 8 and 9, the former being mounted in a bearing in the upper end of the outer cylinder and the latter in a similar bearing formed in a transverse bar 10 in the outer cylinder contiguous to the plane of the upper edge of the scale-beam.

The outer cylinder is provided with spaced indicators for exposing the graduations upon the surface of the inner cylinder, said graduations being arranged in series encircling the inner cylinder in transverse planes or planes at right angles to the axis of the cylinder, and each indicator of the exterior cylinder is adapted to expose either graduation in the series occupying the same plane therewith, a single indicator being employed for each series. In the construction illustrated in the drawings the indicators consist of observation-openings 11, formed in the exterior cylinder and staggered to allow them to occupy positions in contiguous planes corresponding, respectively, with the planes of the series of graduations on the inner cylinder.

Pivoted within the exterior cylinder concentric therewith, and hence concentric with the inner cylinder, is a switch 12, consisting of a lever projecting at one end through a slot in the side of the cylinder to form a handle 13, and mounted upon this switch are double pinions 14 and 15. Each double pinion consists of a small pinion meshing permanently with the gear 7 and a larger pinion adapted to mesh with the teeth of a rack-bar 16, secured to the upper edge of the scale-beam, and by shifting the switch the large member of either double pinion may be brought into engagement with the teeth of the rack.

It is obvious that when either of the larger members of the double pinions is in engagement with the rack linear movement of the poise upon the scale-beam it will cause the pinion to transmit rotary motion to the inner cylinder, and thus bring different graduations of the scales carried by said inner cylinder into view through the observation-openings in the exterior cylinder, and as the amount of rotation of the interior cylinder is proportionate to the extent of movement of the poise upon the scale-beam it will be seen that by arranging the price-graduations in the different series on the inner cylinder in accordance with different units of currency, and the price per unit of weight, the position of the poise upon the scale-beam will indicate in units of weight the amount of a substance or material proportionate to a certain price-graduation of the series in which said unit of currency is found.

A plurality of double pinions is employed in order that the device may be adjusted for weighing upon either the scoop or the platform of a scale, different ratios existing between the weight and the amount of linear movement of the poise upon the scale-beam under said conditions.

The pointer 17, which is employed in connection with the improved poise to indicate the graduation of the scale-beam, in connection with which the poise is used or to which it is adjusted, is adjustably secured to the poise to provide for its movement radially to adapt the poise for a particular scale-beam. It is obvious that the poise must correspond with and be in proportion to the weight employed in connection with the scale-beam, and in order that this correspondence may be secured with accuracy the pointer is adjustably mounted upon the poise by means of a screw 18, extending through a slot in the body portion of the pointer and engaging a threaded opening in the bar 10.

Various changes in the form, proportion, and the minor details of construction may be resorted to without departing from the spirit or sacrificing any of the advantages of this invention.

Having described my invention, what I claim is—

1. A computing poise or pea having a rotary graduated cylinder, stationary indicating means to designate different graduations, pinions meshing with a gear on said cylinder and adapted to communicate motion thereto from a rack on a scale-beam, and a switch carrying said pinions whereby either may be arranged in engagement with the rack on the scale-beam, substantially as specified.

2. A computing poise or pea having a rotary graduated cylinder, stationary indicating means to designate different graduations on the cylinder, a gear carried by the cylinder, a switch consisting of a pivotal lever mounted concentrically with said gear, and double pinions mounted upon the switch, each double pinion comprising a pinion meshing with said gear and a second pinion adapted to mesh with a rack on a scale-beam, whereby either double pinion may be arranged in operative relation with the rack on the scale-beam, substantially as specified.

3. A computing poise or pea having an exterior cylinder provided with observation-openings, an interior rotary cylinder provided with graduations adapted to be exposed through said observation-openings, a gear concentric with and carried by the inner cylinder, a switch fulcrumed concentric with the inner cylinder and having a handle projecting through a slot in the exterior cylinder, and double pinions mounted upon the switch and each comprising a pinion arranged in permanent engagement with said gear and a second pinion adapted to be arranged in engagement with a rack on a scale-beam, either of the second pinions being adapted to be arranged in operative relation with the rack by shifting the switch, substantially as specified.

In testimony that I claim the foregoing as my own I have hereto affixed my signature in the presence of two witnesses.

CASSIUS M. MERRILL.

Witnesses:
   NEWTON G. ROGERS,
   RUTH McCARTHY.